Figure 1:
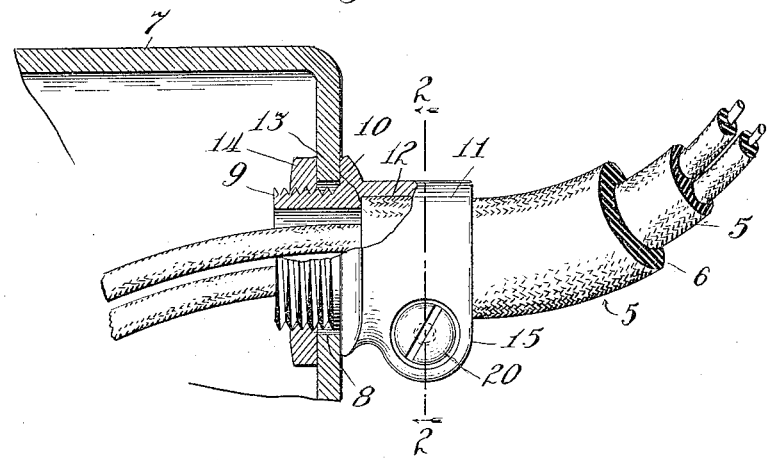

S. R. FRALICK.
ELECTRIC WIRING FITTING.
APPLICATION FILED MAR. 21, 1912.

1,150,935.

Patented Aug. 24, 1915.

Witnesses
Milton Lenoir
L. B. Graham

Inventor
Syles R. Fralick.
By Foree Bain May
Attorneys

UNITED STATES PATENT OFFICE.

SYLES R. FRALICK, OF CHICAGO, ILLINOIS.

ELECTRIC-WIRING FITTING.

1,150,935.  Specification of Letters Patent.  Patented Aug. 24, 1915.

Application filed March 21, 1912. Serial No. 685,210.

*To all whom it may concern:*

Be it known that I, SYLES R. FRALICK, a citizen of the United States, residing at Chicago, in the county of Cook and State of Illinois, have invented certain new and useful Improvements in Electric-Wiring Fittings, of which the following is a specification.

My invention relates to improvements in electric-wiring fittings, and more particularly to couplings for connecting electric conduits, or covered wires or cables, to outlet boxes.

One of the objects of my invention is to provide a coupling of durable and compact construction, of neat appearance, free from sharply protruding parts, easy of application, and efficient in operation.

Other objects of my invention will become apparent to those skilled in the art from a consideration of the following description taken in conjunction with the drawing wherein—

Figure 3:
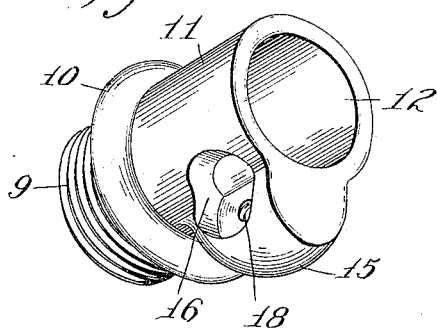
Figure 2:
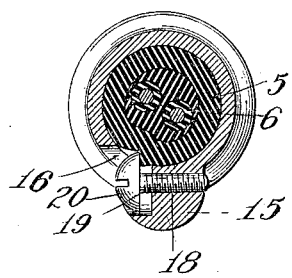

Figure 1 is a side elevation of an outlet-box coupling embodying features of my invention, with parts broken away; Fig. 2 is a section on line 2—2 of Fig. 1; and Fig. 3 is a perspective view of the tubular coupling member.

In the drawing, wherein I have shown an embodiment of my invention for use to connect an electric conduit or cable to an outlet box, 5 indicates a cable, of the armored type, the sheath or armor whereof is indicated at 6, and 7 indicates the outlet box having in its wall an aperture 8 to receive the coupling.

The coupling comprises in a suitable structure, preferably a single machined casting, a stem 9, flange 10, and collar 11, all traversed by an axial bore 12; preferably having therein a stop-shoulder 13 against which the cable sheathing, inserted in collar 11, may abut. The stem 9, inserted through the outlet-box opening 8, receives a nut 14 which draws the flange 10 into contact with the outer surface of the outlet box 7. The stem, flange, and nut are of ordinary construction, and serve as usual convenient means for attaching a collar-receiving collar to the box, said collar, of course, projecting outward from the box in radial or angular position, accordingly as the axis of the bore 12 is straight (as shown) or angular.

15 indicates a lug, formed integrally with the collar 11, and preferably merging into the flange 10 for greater strength, and 16 indicates a recess formed in the side of the lug, intersecting and partially opening into the cable-receiving bore 12. The size and shape of the parts is such that the portion of the lug beyond the recess is thick enough to afford an adequately long screw-threaded perforation 18 to receive and guide the stem of a screw 19 having a head 20, which is preferably flat-bottomed and of suitable lateral extent to reach into the bore 12 of the collar. The recess 16 may be cylindrical, with its axis (and that of the screw-threaded perforation 18) tangential to the collar 11, and with the flat end of the recess substantially in a plane passing through the axis of the cable-receiving collar.

In coupling a cable 5 (or a conduit or the like) to collar 11, the screw 19 is retracted and the cable is slipped into the collar, substantially filling the bore 12 thereof up to the shoulder 13, and consequently lying in the path of travel of the screw-head 20. The screw may now be turned to move the head 20 inwardly until it reaches the space common to the recess 16 and the bore 12 of the collar, when its edge will begin to bite into the sheath 6 of the cable. The arrangement of the screw tangentially to the bore causes the head to bite increasingly deeper into the cable sheath as the screw is turned, so that, as indicated in Fig. 2, the clamping, or biting and clamping, action of the screw firmly anchors the conductor-covering in place.

It will be noted that the coupling shown is of very hardy construction, that there are no sharp protruding parts involved in the cable-engaging means, and that such engaging means is very easy and sure of operation; and it will be understood by those skilled in the art that these and other advantages of my invention may be attained in other embodiments thereof without departing from the spirit of the invention and within the scope of the appended claims.

What I claim is:

1. An electric-wiring fitting comprising a receptive part having a bore, a transverse opening intersecting said bore, and a screw threaded aperture beyond and alining with said transverse opening; and a headed screw having its threaded stem engaging the threaded opening and its head movable in the transverse opening into and out of the bore.

2. An electric wire fitting comprising a receptive part having a bore, a transverse opening intersecting said bore, a screw threaded aperture extending from the bottom of said opening beyond and alining with the opening, and a headed screw having its threaded stem engaging the threaded opening and its head movable in the transverse opening into and out of the bore.

3. An electric wire fitting comprising a receptive part, having a bore, a transverse cylindrical opening intersecting said bore, and a screw threaded aperture beyond and axially alining with said transverse opening; and a circular headed screw, having its threaded stem engaging with the threaded opening and its circular head movable in the cylindrical transverse opening into and out of the bore.

In testimony whereof I hereunto set my hand in the presence of two witnesses.

SYLES R. FRALICK.

In the presence of—
MARY F. ALLEN,
W. LINN ALLEN.

Copies of this patent may be obtained for five cents each, by addressing the "Commissioner of Patents, Washington, D. C."